(12) United States Patent
Da Rocha et al.

(10) Patent No.: US 9,072,219 B2
(45) Date of Patent: Jul. 7, 2015

(54) ROBOTIC MOWER NAVIGATION SYSTEM

(71) Applicant: Deere & Company, Moline, IL (US)

(72) Inventors: Francisco O Da Rocha, Cary, NC (US);
Sven Hahnenkamp, Mannheim (DE);
Mark Foley, Chapel Hill, NC (US)

(73) Assignee: DEERE & COMPANY, Moline, IL (US)

( * ) Notice: Subject to any disclaimer, the term of this patent is extended or adjusted under 35 U.S.C. 154(b) by 91 days.

(21) Appl. No.: 13/857,434

(22) Filed: Jun. 20, 2013

(65) Prior Publication Data

US 2014/0379196 A1    Dec. 25, 2014

(51) Int. Cl.
*G01C 22/00* (2006.01)
*A01D 34/00* (2006.01)
*G05D 1/02* (2006.01)

(52) U.S. Cl.
CPC ............ *A01D 34/008* (2013.01); *G05D 1/0265* (2013.01); *Y10S 901/01* (2013.01); *G05D 1/0225* (2013.01); *G05D 2201/0208* (2013.01)

(58) Field of Classification Search
CPC .............. A01D 34/008; G05D 1/0265; G05D 2201/0208; G05D 1/0255
USPC ........... 701/2, 23, 26, 400; 700/258; 324/654; 901/1
See application file for complete search history.

(56) References Cited

U.S. PATENT DOCUMENTS

| 3,570,227 | A |   | 3/1971  | Bellinger |           |
|-----------|---|---|---------|-----------|-----------|
| 4,133,404 | A | * | 1/1979  | Griffin   | 180/169   |
| 4,919,224 | A |   | 4/1990  | Shyu et al. |         |
| 5,163,273 | A | * | 11/1992 | Wojtkowski et al. | 56/11.9 |
| 6,255,793 | B1 |  | 7/2001  | Peless et al. |       |
| 6,321,515 | B1 | * | 11/2001 | Colens    | 56/10.2 A |
| 6,417,641 | B2 |  | 7/2002  | Peless et al. |       |
| 6,615,108 | B1 |  | 9/2003  | Peless et al. |       |
| 6,850,024 | B2 |  | 2/2005  | Peless et al. |       |
| 6,885,912 | B2 | * | 4/2005  | Peless et al. | 700/245 |
| 7,155,309 | B2 | * | 12/2006 | Peless et al. | 700/245 |
| 7,349,759 | B2 | * | 3/2008  | Peless et al. | 700/245 |
| 7,668,631 | B2 |  | 2/2010  | Bernini    |        |
| 8,027,761 | B1 | * | 9/2011  | Nelson     | 701/23  |
| 8,306,659 | B2 |  | 11/2012 | Abramson et al. |    |
| 8,352,113 | B2 | * | 1/2013  | Johnson et al. | 701/26 |

(Continued)

FOREIGN PATENT DOCUMENTS

WO    11129728 A1    10/2011

OTHER PUBLICATIONS

KA LawnBoll. Product Brochure. Kyodo America, KA Home Robotics. Lawrenceville, GA <URL:http://www.lawnbott.com/>.

*Primary Examiner* — Tuan C. To
*Assistant Examiner* — Shardul Patel

(57) ABSTRACT

A robotic mower navigation system includes a plurality of sensors on a robotic mower that detect strength and polarity of a magnetic field from an electric current through a boundary wire. An electronic control unit receives data concerning the magnetic field from the plurality of sensors as the robotic mower follows the boundary wire, tracks the data provided by the sensors, compares the data with a reference pattern that defines at least one specified feature of the boundary wire, and provides commands to the robotic mower based on the comparison. The electronic control unit may command the robotic mower to follow a second boundary wire to a remotely located charging station instead of the first boundary wire based on detected features of the boundary wire such as sharp corners or crossings.

17 Claims, 5 Drawing Sheets

(56) References Cited

U.S. PATENT DOCUMENTS

| | | | |
|---|---|---|---|
| 8,392,044 B2* | 3/2013 | Thompson et al. | 701/23 |
| 8,855,914 B1* | 10/2014 | Alexander et al. | 701/400 |
| 2005/0113990 A1* | 5/2005 | Peless et al. | 701/23 |
| 2008/0039974 A1* | 2/2008 | Sandin et al. | 700/258 |
| 2008/0183349 A1* | 7/2008 | Abramson et al. | 701/23 |
| 2009/0281661 A1* | 11/2009 | Dooley et al. | 700/258 |
| 2011/0234153 A1 | 9/2011 | Abramson | |
| 2012/0029752 A1 | 2/2012 | Johnson et al. | |
| 2012/0029753 A1 | 2/2012 | Johnson et al. | |
| 2012/0029755 A1* | 2/2012 | Johnson | 701/26 |
| 2013/0025248 A1 | 1/2013 | Kraft et al. | |
| 2013/0066484 A1* | 3/2013 | Markusson et al. | 701/2 |
| 2013/0184924 A1* | 7/2013 | Jagenstedt et al. | 701/23 |
| 2013/0282224 A1* | 10/2013 | Yazaki et al. | 701/24 |

* cited by examiner

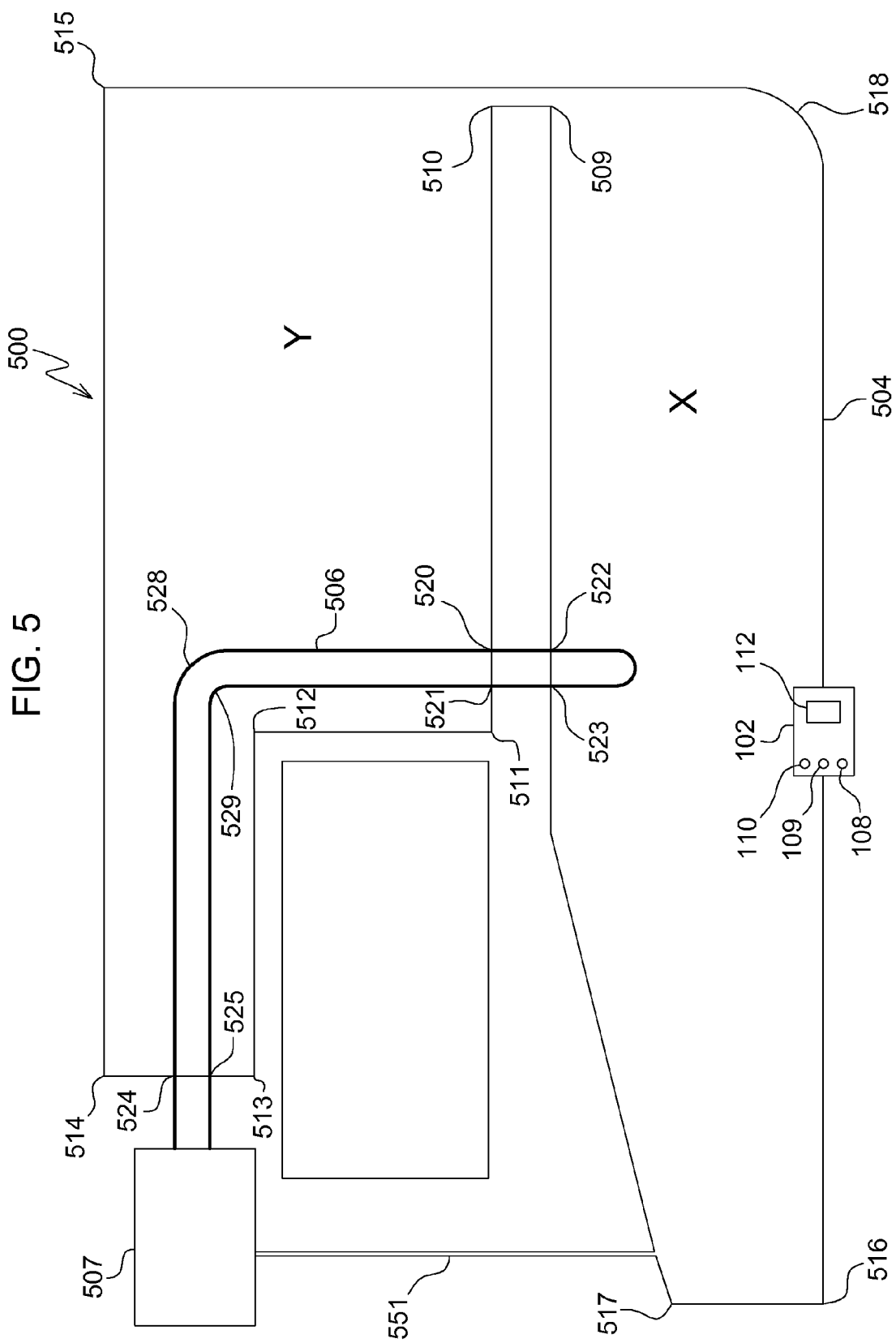

ROBOTIC MOWER NAVIGATION SYSTEM

FIELD OF THE INVENTION

This invention relates to robotic lawn mowers, and more specifically to robotic mower navigation systems.

BACKGROUND OF THE INVENTION

Robotic mower navigation systems direct travel of robotic mowers within yards or to specific locations or portions of yards by measuring distances traveled from known references (e.g., charging stations) following boundary wires. Robotic mower navigation systems may include electronic control units that collect odometry data by measuring wheel rotation. However, wheel slippage caused by traction lost on wet grass, loose dirt, side hill compensation to drive in a straight line, or other reasons may result in significant distance measurement errors over typical boundary wires. Distances measured by odometry may not match actual distances traveled by robotic mowers, and it is challenging to predict the exact paths traveled by robotic mowers. As a result, robotic mower navigation systems lack high accuracy to navigate to specific locations or portions of yards within boundary wires, and also lack high precision to reliably and repeatably navigate to such locations or areas. A robotic mower navigation system is needed that does not use odometry and is not required to predict the exact travel path of a robotic mower.

To achieve high accuracy and/or precision to deploy robotic mowers to specific locations or areas, some robotic mower navigation systems include global positioning systems (GPS), radio or light tags, RFID, ultrasound/laser/radio triangulation, or simultaneous localization and mapping (SLAM). However, these navigation systems are relatively expensive. A robotic mower navigation system is needed that is inexpensive and achieves high accuracy and high precision to navigate to specific locations or portions of yards within boundary wires.

SUMMARY OF THE INVENTION

A robotic mower navigation system includes a plurality of sensors on a robotic mower that detect strength and polarity of a magnetic field from an electric current through a boundary wire. An electronic control unit receives data concerning the magnetic field from the plurality of sensors as the robotic mower follows the boundary wire, tracks the data provided by the sensors, compares the data with a reference pattern that defines at least one specified feature of the boundary wire, and provides commands to the robotic mower based on the comparison. The electronic control unit may command the robotic mower to follow a second boundary wire to a remotely located charging station by detecting features of the boundary wire such as sharp corners or crossings. The robotic mower navigation system provides a relatively inexpensive system to position a robotic mower within an area or sub-area without odometry and without predicting the exact travel path. The robotic mower navigation system can achieve high accuracy and high precision to navigate to specific locations or portions of yards within boundary wires.

BRIEF DESCRIPTION OF THE DRAWINGS

FIG. 5 is a drawing of a robotic mower navigation system having two different boundary wires connected to a charging station according to a third embodiment of the invention.

DESCRIPTION OF THE PREFERRED EMBODIMENT

Figure 1:
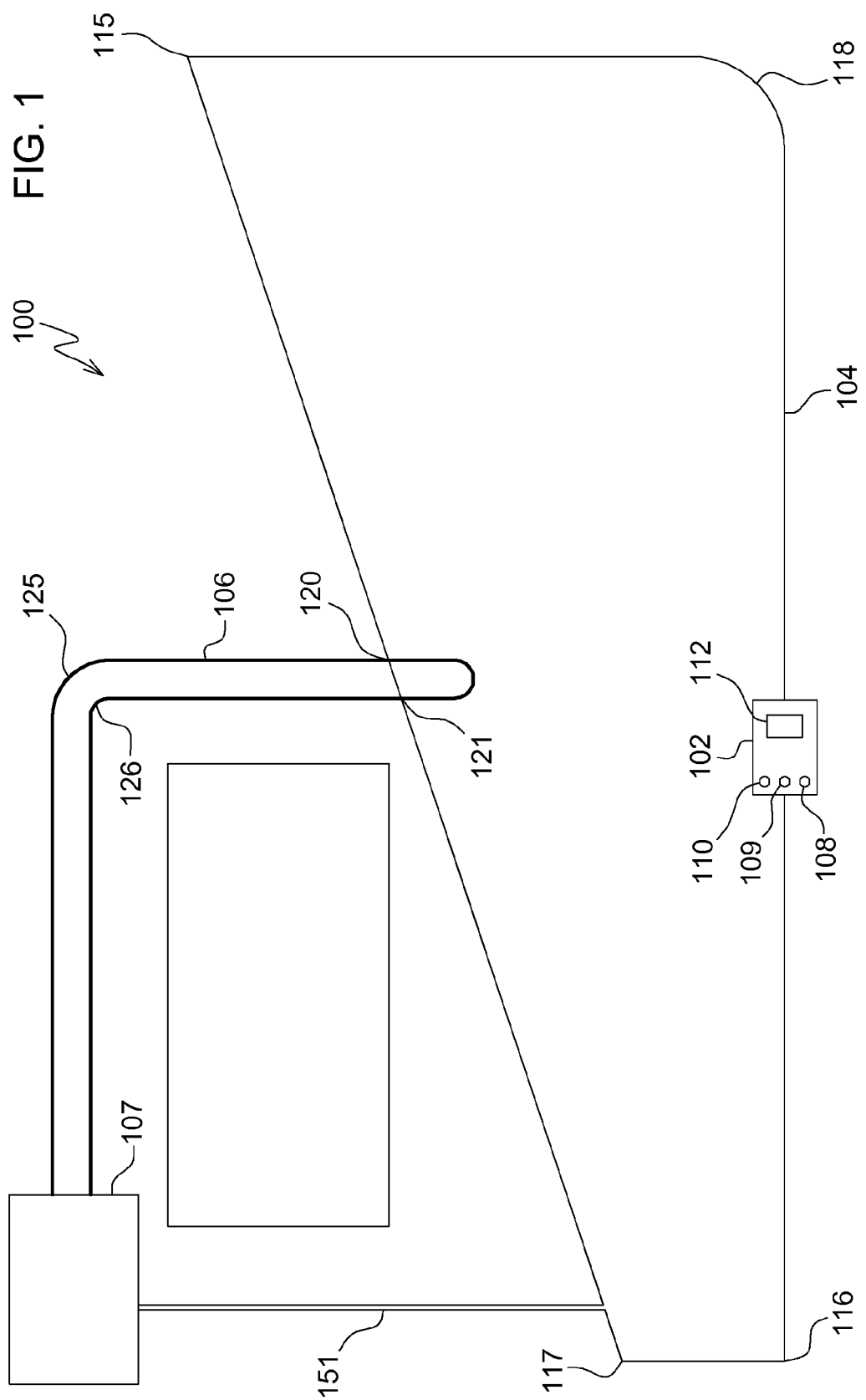
FIG. 1 is a drawing of a robotic mower navigation system having two different boundary wires connected to a charging station according to a first embodiment of the invention.

In one embodiment shown in FIG. 1, robotic mower navigation system 100 includes robotic mower 102 that may detect certain features of one or more boundary wires 104, 106 that may be encountered while the robotic mower travels along either boundary wire. Each boundary wire may form a loop with both ends of the loop connected to charging station 107 which provides current pulses that create an electromagnetic field along the wire. Two or more boundary wire loops may be installed on the same general area and can be driven with current pulses having different characteristics such that those pulses can be clearly identified by digital signal processing on the robotic mower.

In one embodiment, robotic mower navigation system 100 may include a robotic mower having a plurality of sensors 108, 109, 110 that may be electrically connected to electronic vehicle control unit 112. Each sensor may include a coil that senses the polarity and strength of the electromagnetic field from the boundary wire. The sensors may be arranged on the robotic mower in a known geometry that will provide signal data for different points on the robotic mower at the same time, and allows acquisition of field surface data.

In one embodiment, electronic vehicle control unit 112 may control all of the electronic functions of the robotic mower. For example, the vehicle control unit may command a pair of traction motors to turn traction drive wheels, a blade motor to rotate a cutting blade or blades, a battery pack, a user interface and various sensors. Vehicle control unit 112 may be a printed circuit board assembly that serves as the main control board for the robotic mower. The vehicle control unit may interpret and process information from various sensors, and use that information to control and operate the pair of traction motors at the same or different speeds to drive the robotic mower over a yard in order to maintain the lawn, and to drive the blade motor. The vehicle control unit also may communicate with a battery pack in order to monitor the status of the battery pack to maintain a charge for one or more lithium ion batteries in the battery pack. The vehicle control unit also may be connected to a user interface module including an LCD display along with several indicator lights and key buttons for operator input. The robotic mower navigation system also may include various other features as described in U.S. patent application Ser. No. 12/845,326 filed on Jul. 28, 2010, which is incorporated by reference in its entirety in this present application.

In one embodiment, robotic mower navigation system 100 may include an electronic vehicle control unit that may recognize, track and/or count certain boundary wire features from data provided by the sensors. By recognizing and tracking certain boundary wire features, the robotic mower navigation system may accurately and precisely navigate the robotic mower along one or more boundary wires to specific locations or areas within a yard.

In one embodiment, robotic mower navigation system 100 may include a left sensor 108, center sensor 109 and right sensor 110. These sensors preferably may be mounted on portions of robotic mower 102 so that the center sensor is the closest sensor to first boundary wire 104 as the robotic mower follows along the boundary wire, and the left and right sensors are on portions of the robotic mower that are offset laterally to the left and right of the center sensor. Each of the sensors may be located on or adjacent a front end of the robotic mower on a protective cover or shell.

In one embodiment, robotic mower navigation system 100 may include an electronic vehicle control unit that commands the robotic mower to follow a boundary wire having a plurality of boundary wire features. Each boundary wire feature may be at one or more specified locations that may be configured by the operator before the robotic mower is used. One or more of the boundary wire features may change the polarity and strength of the magnetic field that is detected by sensors on the robotic mower when the robotic mower reaches the feature along the boundary wire. For example, the left sensor, center sensor, and/or right sensor may detect a boundary wire feature at the same or substantially the same time. Alternatively, the left sensor, center sensor, and/or right sensor may detect a boundary wire feature at different times.

In one embodiment, robotic mower navigation system 100 may include boundary wire features based on how one or more boundary wires 104, 106 are arranged or placed on or below the yard surface, and specifically the geometry of how each boundary wire may change direction and/or cross another boundary wire. As shown in FIG. 1, boundary wire features may include but are not limited to sharp corners 115, 116, 117 and smooth corner 121 along first boundary wire 104, and smooth corners 122, 123 along second boundary wire 106. For example, the geometry of sharp corners may be defined by a corner having a radius of curvature of less than about 30 cm. However, the robotic mower navigation system may define a sharp corner as a corner with a radius greater or smaller than 30 cm, depending on various features of the system, including the boundary wire signal itself, the sensors on the robotic mower, and reference signal patterns stored in the electronic vehicle control unit.

In one embodiment, the robotic mower navigation system may include an electronic vehicle control unit that may recognize and distinguish each sharp corner from each smooth corner. When encountering a corner, the electronic vehicle control unit may use data from one or more of the sensors to command each of the left and right traction drive wheel motors to rotate at different speeds that may be necessary and sufficient for the robotic mower to follow the boundary wire around the corner. If the electronic vehicle control unit receives data from the sensors indicating abrupt changes in polarity and signal strength matching reference signal patterns, the vehicle control unit determines it is a sharp corner. If the electronic vehicle control unit receives data from the sensors that do not include such changes in polarity and signal strength (and the wheels are rotating at different speeds), the electronic vehicle control unit determines it is a smooth corner.

In one embodiment, as shown in FIG. 1, the boundary wire features of the robotic mower navigation system also may include sharp crossings 130, 131 between boundary wires 104 and 106. The geometry of sharp crossings may not be limited to specific angles, but it is preferred that sharp crossings have an angle of about 90 degrees between the boundary wires. However, the electronic vehicle control unit may detect and recognize a sharp crossing having an angle between about 45 degrees and about 135 degrees depending on various features of the system, including the boundary wire signal itself, the sensors on the robotic mower, and reference signal patterns stored in the electronic vehicle control unit. If the electronic vehicle control unit receives data from the sensors indicating abrupt changes in polarity and signal strength matching certain reference signal patterns while traveling in a generally straight line, the vehicle control unit determines it is a sharp crossing. If the electronic vehicle control unit receives data from the sensors that include other changes in polarity and signal strength, the electronic vehicle control unit may determines it is a smooth crossing.

In one embodiment, as shown in FIG. 1, robotic mower navigation system 100 may include charging station 107 that may be remotely located from the area to be mowed that is enclosed by first boundary wire 104. Robotic mower 102 may go out of the yard or area enclosed by first boundary wire 104 to recharge at the charging station. To reach the charging station, the robotic mower may turn onto second boundary wire 106 instead of first boundary wire 104.

In the embodiment of FIG. 1, second boundary wire 106 may not form or define a boundary of an area to be mowed, but instead may provide a narrow path or corridor to travel from one area or location to another area or location. The narrow path or corridor may include boundary wires that are preferably at least about 12 inches apart having opposite current pulse directions. The robotic mower navigation system may use the second boundary wire as a path for a robotic mower to enter and exit an area to be mowed. However, the robotic mower may not follow a path or corridor where boundary wires having opposite current pulse directions are less than about 6 inches apart. For example, the robotic mower will not follow path 151 in FIG. 1 where boundary wires having opposite current pulse directions are very close together. The signals for this portion of the boundary wire cancel each other out and will not be detected by the sensors.

In one embodiment, robotic mower navigation system 100 may provide commands to the wheel motors of the robotic mower based on the robotic mower's location along a boundary wire. Significantly, the robotic mower navigation system may determine the location along the boundary wire and provide commands to the wheel motors without requiring odometry, and does not require calculating distance traveled based on revolutions of traction drive wheels. The robotic mower navigation system also does not require geopositioning or other landmark-based finding systems to determine the location of the robotic mower.

Figure 2:
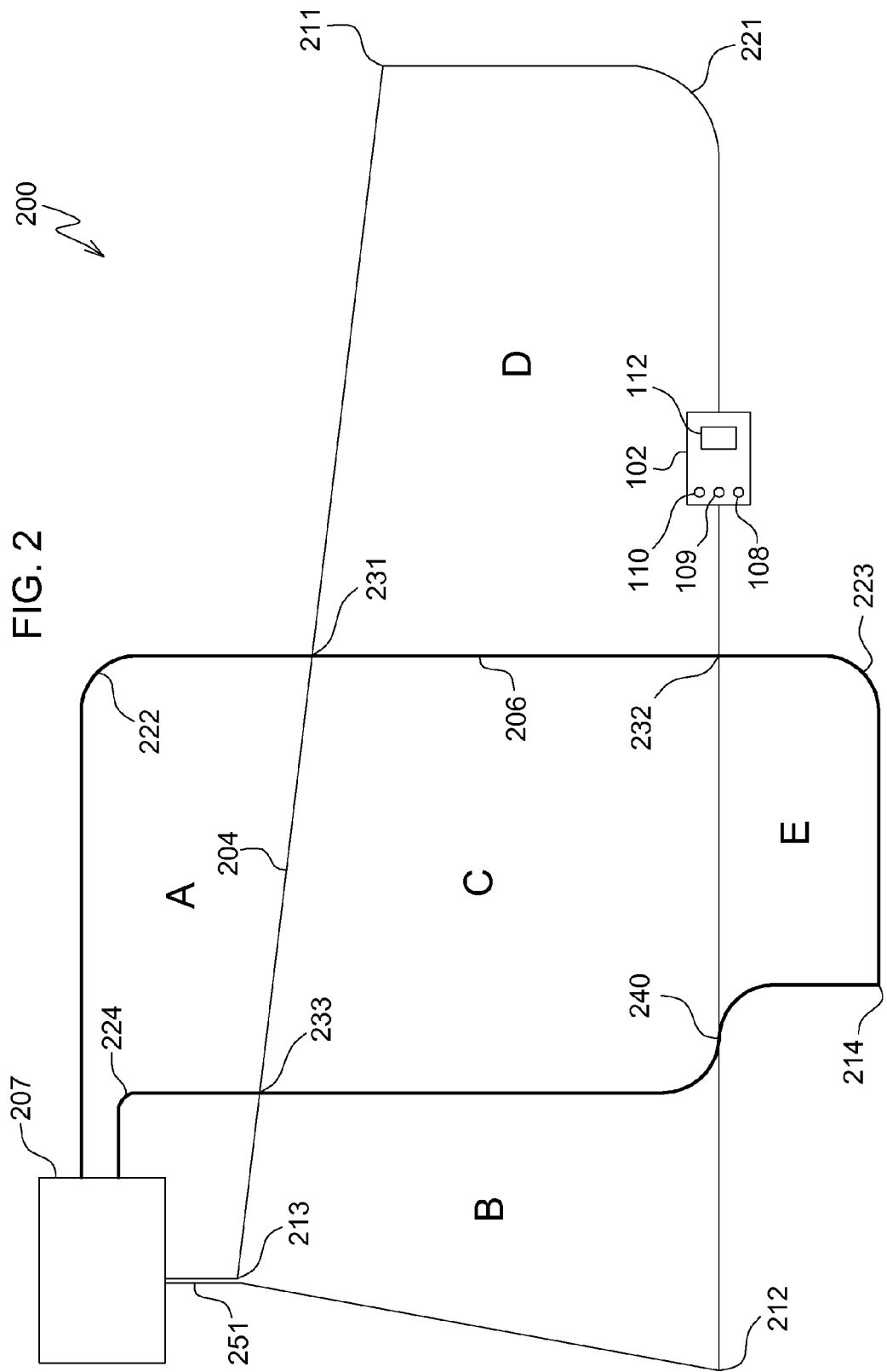
FIG. 2 is a drawing of a robotic mower navigation system having two different boundary wires connected to a charging station according to a second embodiment of the invention.

In an embodiment shown in FIG. 2, robotic mower navigation system 200 includes first and second boundary wires 204, 206 connected to charging station 207, with each wire arranged or placed on or below the yard surface, and having geometry defining how each boundary wire changes direction and/or crosses the other boundary wire. For example, boundary wire features may include but are not limited to sharp corners 211, 212, 213 and smooth corner 221 along first boundary wire 204, and sharp corner 214 and smooth corners 222, 223, 224 along second boundary wire 206. Additionally, the boundary wire features shown in FIG. 2 may include but are not limited to sharp crossings 231, 232, 233 and smooth crossing 240 between first and second boundary wires 204 and 206. FIG. 2 also shows path 251 that the robotic mower will not follow because boundary wires having opposite current pulse directions are so close together that signals for this portion of the boundary wire cancel each other out and will not be detected.

In one embodiment, the robotic mower navigation system may be used to select specific sub-areas to mow. For example, the first and second boundary wires may define sub-areas A, B, C, D and E shown in FIG. 2. As the robotic mower follows one of the boundary wires, the vehicle control unit may determine the robotic mower's location along that boundary wire by tracking boundary wire features such as sharp and smooth corners or crossings. The vehicle control unit then may command the robotic mower to move away from the boundary wire it has followed into a specified sub-area for mowing. Additionally, the vehicle control unit may communicate with sprinkler controls, or the charging station may be connected to sprinkler controls, and command the robotic mower to mow in sub-areas where the sprinklers are not currently used.

Figure 3:
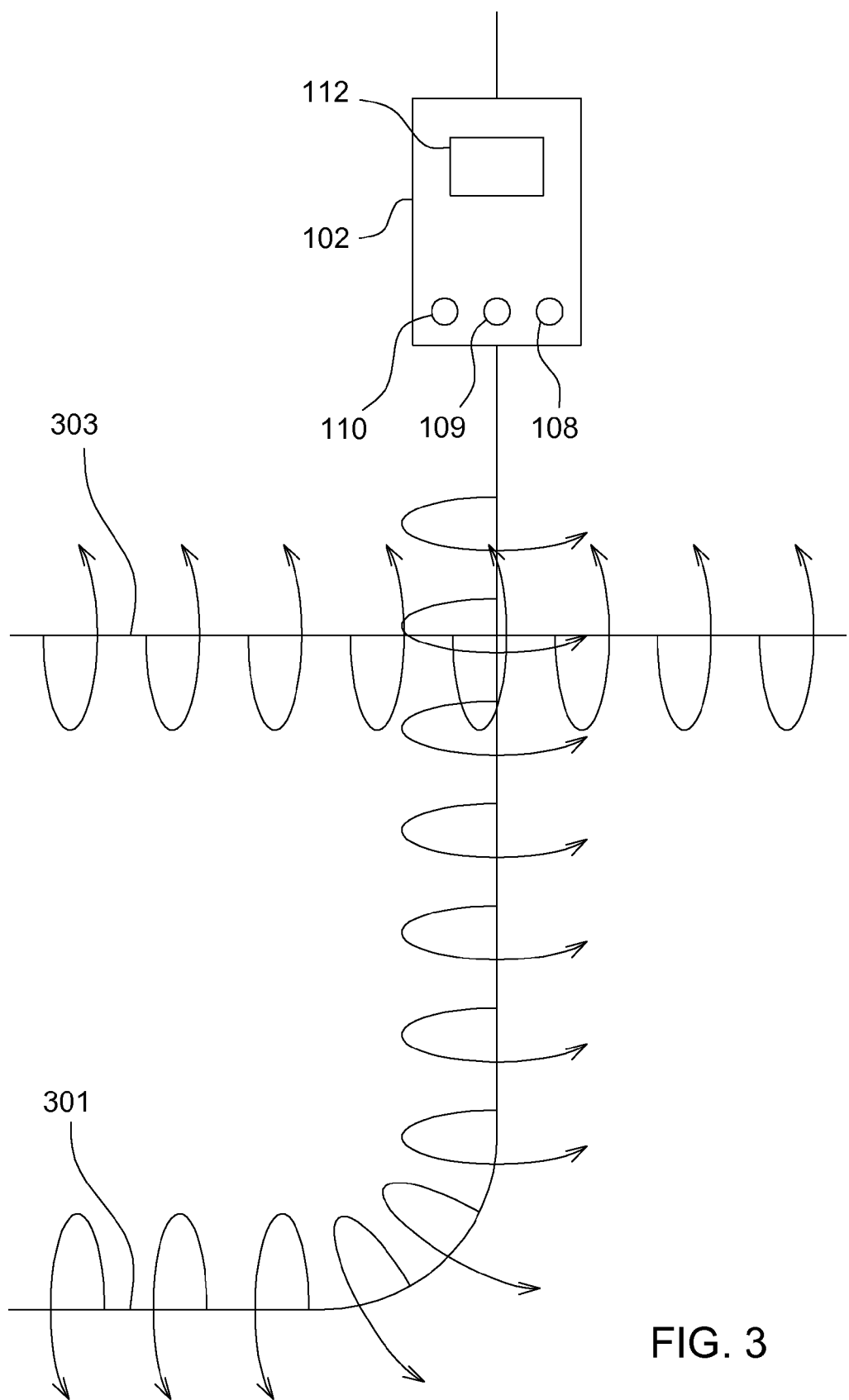
FIG. 3 is a schematic representation of a robotic mower navigation system including a robotic mower following a boundary wire boundary according to a first embodiment of the invention.

In one embodiment, each sensor on the robotic mower may sense the polarity and strength distribution of electromagnetic signals created by electrical current from the charging station through one or more boundary wires. For example, as shown in FIG. 3, each of a plurality of sensors 108, 109, 110 on robotic mower 102 may provide data showing the same or similar polarity and signal strength from boundary wire 301 being followed in a straight line or around smooth corner 302. However, each of the sensors may provide data showing an abrupt change in polarity and signal strength from boundary wire 303 that is crossed at a sharp or perpendicular intersection with boundary wire 301, or around a sharp corner. The sensors may show little or no change of polarity and signal strength when encountering smooth corners. Each sensor may provide signal data to the electronic control unit that may be a sum or combination of signals from boundary wires being followed and crossed.

In one embodiment, each sensor may provide signal data to the electronic vehicle control unit, which may differentiate between different boundary wire features, such as sharp and smooth boundary wire corners and/or sharp and smooth crossings. The electronic control unit on the robotic mower may be programmed to take actions based on the sequence of boundary wire features encountered by the sensors while the robotic mower follows the boundary wire.

In one embodiment, each of a plurality of sensors on the robotic mower may provide signal data to the electronic vehicle control unit, for example every 100 microseconds. The electronic vehicle control unit may compare the polarity and strength of the sensor signals with reference signal patterns for certain boundary wire features stored in the electronic control unit memory. For example, the electronic control unit may compare sensor signals with known or reference signal patterns for left, center and right sensors indicating boundary wire features such as sharp boundary wire crossings. By comparing each series of sensor signals to reference signal patterns for various boundary wire features, the electronic control unit can determine which if any boundary wire features the sensors have encountered. Additionally, the electronic control unit may store and track the number of each boundary wire features that have been encountered.

Figure 4:
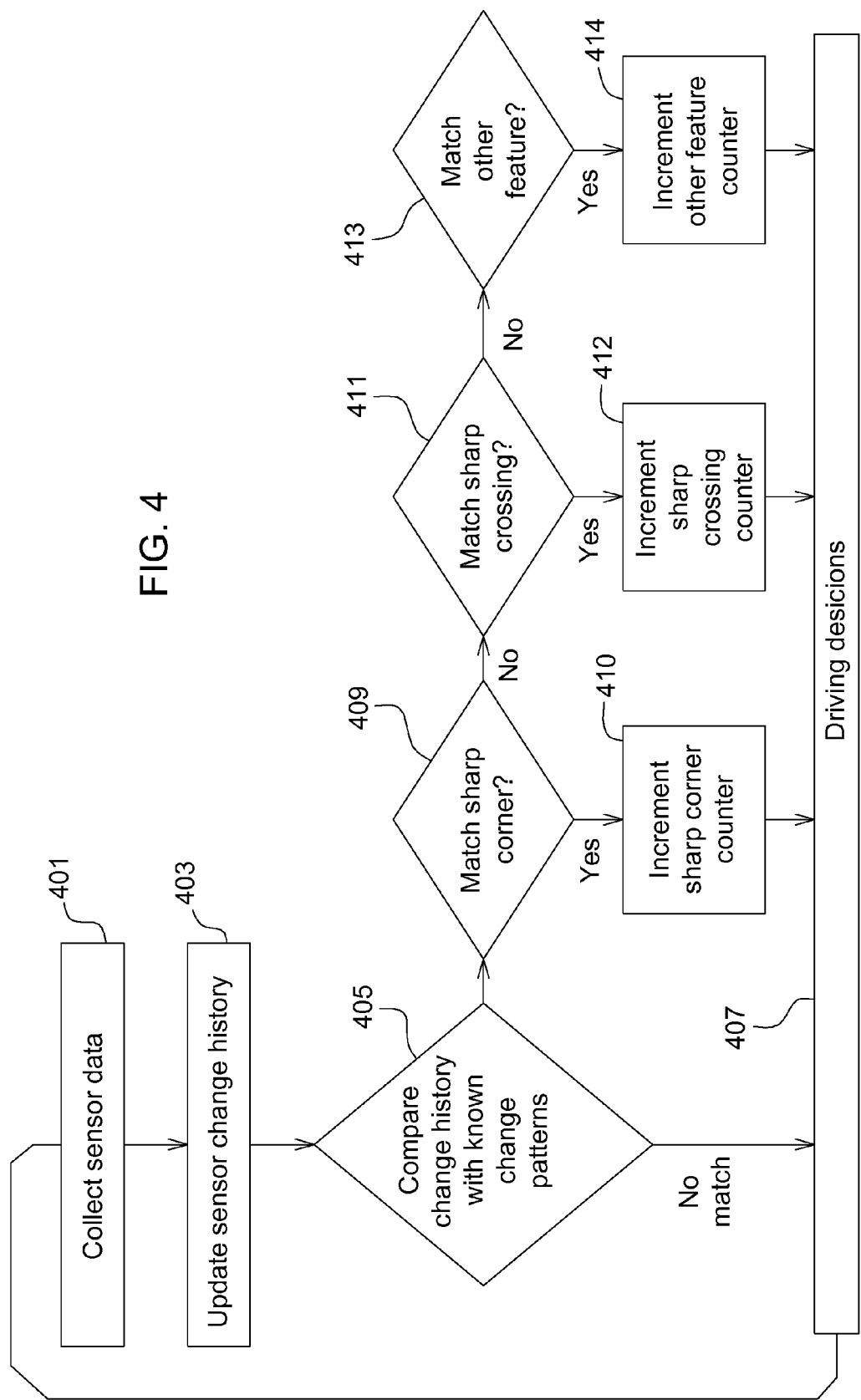
FIG. 4 is a logic flow diagram of a robotic mower navigation system according to a first embodiment of the invention.

In one embodiment, as shown in FIG. 4, the electronic vehicle control unit of the robotic mower may use an algorithm to compare the history of signal changes from a plurality of sensors with known change patterns as the robotic mower is following a boundary wire. For example, in block 401, the electronic control unit may collect sensor data from the plurality of sensors, and most preferably from left, center and right sensors. In block 403, the electronic vehicle control unit may update sensor change history stored in memory. In block 405, the electronic control unit may compare the change history of the plurality of sensors with known change patterns for certain boundary wire features. If there is no match, the electronic control unit may continue to command the robotic mower to follow a driving pattern along the boundary wire in block 407. In block 409, if the electronic vehicle control unit finds the change history matches a sharp corner change pattern, the electronic control unit may increment a sharp corner counter in block 410. Similarly, in block 411, if the electronic control unit finds the change history matches a sharp crossing change pattern, the electronic control unit may increment a sharp crossing counter in block 412. In block 413, if the electronic vehicle control unit finds the change history matches one or more other boundary wire features, the electronic control unit may increment a corresponding counter in block 414.

In one embodiment, electronic vehicle control unit 112 on the robotic mower may include a memory that stores or contains one or more specified driving patterns or other actions that the electronic control unit may command based on the values of counters incremented in blocks 410, 412 or 414. For example, the electronic control unit may command the wheel motors of the robotic mower to follow a specified driving pattern after one or more counters reach a specified value. Alternatively, the electronic control unit may command the wheel motors of the robotic mower to follow a specified driving pattern if one or more counters are incremented in a specified sequence. The specified driving patterns may include, but are not limited to, turning away from a boundary wire that was followed, or following another boundary wire that was or is encountered. Additionally, the electronic vehicle control unit may command the robotic mower to take other actions based on the value of counters or sequence of incrementing counters. For example, the electronic control unit may command the robotic mower to start or discontinue mowing in a certain area or sub-area and may activate or deactivate a blade motor.

FIG. 5 shows a third embodiment of robotic mower navigation system 500 having boundary wires 504, 506 that are arranged or placed on or below the yard surface having sub-areas X and Y. As shown in FIG. 5, boundary wire features may include but are not limited to sharp corners 509, 510, 511, 512, 513, 514, 515, 516 and 517 and smooth corner 518 along first boundary wire 504, and smooth corners 528 and 529 along second boundary wire 506. The boundary wire features also may include sharp crossings 520, 521, 522, 523, 524 and 525 between boundary wires 504 and 506. In the embodiment of FIG. 5, robotic mower navigation system 500 may include charging station 507 that may be remotely located from sub-area X that is enclosed by first boundary wire 504. Based on the count or sequence of features along boundary wire 504, the electronic vehicle control unit may be programmed to command robotic mower 102 to turn onto second boundary wire 506 instead of first boundary wire 504 to go between sub-area X and sub-area Y. The electronic vehicle control unit also may command the robotic mower to go to the charging station by following boundary wire 506 out from sub-area Y, or by turning from first boundary wire 504 in sub-area Y onto second boundary wire 506.

In the embodiment of FIG. 5, as in the embodiment of FIG. 1, second boundary wire 506 does not form or define a boundary of an area to be mowed, but instead provides a narrow path or corridor to travel from one area or location to another area or location. The electronic vehicle control unit may determine the location of the robotic mower along the boundary wire perimeters of sub-areas X or Y and provide commands to the wheel motors based on boundary wire feature data from the sensors. As the robotic mower follows one of the boundary wires, the electronic vehicle control unit may determine the robotic mower's location along that boundary wire by tracking boundary wire features such as sharp and smooth corners or crossings. For example, the electronic vehicle control unit of robotic mower navigation system may use boundary wire feature data to select which of sub-areas X and Y to mow. The vehicle control unit also may communicate with sprinkler controls, or the charging station may be connected to sprinkler controls, and command the robotic mower to mow in sub-areas where the sprinklers are not currently used. The vehicle control unit then may command the robotic mower to move away from the boundary wire it has followed into one of the sub-areas for mowing. The robotic mower will not follow path 551 because boundary wires having opposite current pulse directions are so close together that signals for this portion of the boundary wire cancel each other out and will not be detected.

Having described the preferred embodiment, it will become apparent that various modifications can be made without departing from the scope of the invention as defined in the accompanying claims.

The invention claimed is:

1. A robotic mower navigation system, comprising: a robotic mower having a plurality of sensors that detect strength and polarity of a magnetic field from an electric current through a boundary wire; and an electronic control unit receiving data concerning the magnetic field from the plurality of sensors as the robotic mower follows the boundary wire, determining if the data shows an abrupt change in polarity and signal strength along the boundary wire indicating a specified geometric feature of the boundary wire, tracking the data for a sequence of the specified geometric features, comparing the data with a plurality of reference patterns that define location along the boundary wire, and providing a command to the robotic mower based on the comparison.

2. The robotic mower navigation system of claim 1 wherein at least one specified feature of the boundary wire is a sharp corner.

3. The robotic mower navigation system of claim 1 wherein at least one specified feature of the boundary wire is a sharp crossing with a second boundary wire.

4. The robotic mower navigation system of claim 1 wherein the electronic control unit provides a command to move away from the boundary wire.

5. The robotic mower navigation system of claim 1 wherein the electronic control unit provides a command to follow a second boundary wire.

6. The robotic mower navigation system of claim 1 wherein the plurality of sensors includes a left sensor, a center sensor and a right sensor; the center sensor being closest to the boundary wire that is followed.

7. A robotic mower navigation system comprising: a first boundary wire around a perimeter of an area; a second boundary wire crossing the first boundary wire at least once; a charging station connected to the first and the second boundary wires and providing current through the first and second boundary wires; and a vehicle control unit commanding a robotic mower to follow the second boundary wire to the charging station instead of the first boundary wire by detecting and tracking abrupt changes in polarity and signal strength at each of a plurality of sharp crossings of the first and the second boundary wires, determining if the data shows an abrupt change in polarity and signal strength along the boundary wire indicating a specified geometric feature of the boundary wire.

8. The robotic mower navigation system of claim 7 wherein the vehicle control unit tracks the number of sharp crossings of the first and the second boundary wires.

9. The robotic mower navigation system of claim 7 wherein the vehicle control unit detects sharp crossings of the first and second boundary wires by comparing polarity and signal strength data from a plurality of sensors on the robotic mower with a known change pattern.

10. The robotic mower navigation system of claim 7 wherein the charging station is at a remote location from the area.

11. The robotic mower navigation system of claim 7 wherein the vehicle control unit commands the robotic mower to stop mowing when following the second boundary wire to the charging station.

12. The robotic mower navigation system of claim 7 wherein the vehicle control unit also detects sharp corners of the first and second boundary wires by comparing polarity and signal strength data from a plurality of sensors on the robotic mower with a known change pattern.

13. A robotic mower navigation system comprising: a plurality of boundary wires, each boundary wire forming a loop having ends connected to a charging station which provides current pulses that create an electromagnetic field along each boundary wire; each boundary wire driven with current pulses having different characteristics such that those pulses can be identified by a vehicle control unit on a robotic mower; a plurality of boundary wire features based on how the boundary wires are placed on or below a yard surface and including geometries for how each of the boundary wires changes direction or crosses another boundary wire; a plurality of sensors on the robotic mower that sense the electromagnetic field along each boundary wire and provide data to the vehicle control unit; the vehicle control unit tracking each abrupt change in polarity and signal strength resulting from each of the boundary wire features and commanding a traction drive motor and a mowing motor to operate in a specified area based on the boundary wire tracking.

14. The robotic mower navigation system of claim 13 wherein the boundary wires define a plurality of sub-areas; the vehicle control unit commanding the traction drive motor and the mowing motor to operate the robotic mower in specified sub-areas based on the boundary wire feature tracking.

15. The robotic mower navigation system of claim 13 wherein the boundary wire features include sharp angle corners and sharp angle crossings.

16. The robotic mower navigation system of claim 13 wherein one of the plurality of boundary wires provides a path to a location that is remotely located from an area enclosed by another boundary wire.

17. The robotic mower navigation system of claim 13 wherein the vehicle control unit identifies features of the boundary wire by comparing a change history of data received from the plurality of sensors with known change patterns.

* * * * *